US006725380B1

(12) United States Patent
Forlenza et al.

(10) Patent No.: US 6,725,380 B1
(45) Date of Patent: Apr. 20, 2004

(54) SELECTIVE AND MULTIPLE PROGRAMMED SETTINGS AND PASSWORDS FOR WEB BROWSER CONTENT LABELS

(75) Inventors: Randolph Michael Forlenza, Austin, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/373,878

(22) Filed: Aug. 12, 1999

(51) Int. Cl.[7] ............ G06F 11/30; G06F 1/04; H04L 9/32
(52) U.S. Cl. ......... 713/202; 713/151; 713/152; 713/166; 713/165
(58) Field of Search ............... 713/202, 600, 713/151–152, 166, 165, 502

(56) References Cited

U.S. PATENT DOCUMENTS

| | | | |
|---|---|---|---|
| 5,678,041 A | 10/1997 | Baker et al. | |
| 5,696,898 A | 12/1997 | Baker et al. | |
| 5,832,212 A | 11/1998 | Cragun et al. | |
| 6,041,330 A | * 3/2000 | Carman et al. | 707/101 |
| 6,076,166 A | * 6/2000 | Moshfeghi et al. | 713/201 |
| 6,138,142 A | * 10/2000 | Linsk | 709/203 |
| 6,510,458 B1 | * 1/2003 | Berstis et al. | 709/219 |

OTHER PUBLICATIONS

"Ratings–Frequently Asked Questions", Internet Address http://www.eu.microsoft.com/windows/ie/ie3/ratefaq.htm.
"Supervisor Password" Internet Address http://www.actden.com/ie4/unit6/6_password.htm.
"Censor Settings" Internet Address http://www.actden.com/ie4/unit6/6_settings.htm.

* cited by examiner

Primary Examiner—Gilberto Barrón
Assistant Examiner—Grigory Gurshman
(74) Attorney, Agent, or Firm—David A. Mims, Jr.; Bracewell & Patterson, L.L.P.

(57) ABSTRACT

A system and method are disclosed that regulate browsing of web content or content labels and that provide selective and multiple programmed settings and passwords for web content labels. In one embodiment, at least some of the web pages accessible to a web browser are assigned content labels. Programmed settings are established for the content labels that are to be password protected. A content password is assigned to each of the programmed settings. Access to web pages without any content labels is strictly denied by the web browser. Access to web pages with content labels that are not being regulated is allowed. Access to web pages with content labels that are password protected is regulated.

25 Claims, 9 Drawing Sheets

SELECTIVE AND MULTIPLE PROGRAMMED SETTINGS AND PASSWORDS FOR WEB BROWSER CONTENT LABELS

BACKGROUND OF THE INVENTION

1. Technical Field

The present invention relates in general to regulating and controlling browsing by a web browser of web pages having various assigned contents and/or content labels and in particular to provide selective, multiple, and various programmed settings of restricted content labels for web pages and providing content passwords to allow or prohibit browsing of web pages with particular contents and/or content labels and providing a change password for changing the programmed settings of the restricted content labels and the content passwords.

2. Description of the Related Art

Browsing of web pages has become commonplace in the use of computers and the Internet. The problem with web browsers have been the regulation and control of viewing various types of web page contents having different ratings over the Internet. For example, web pages containing indecent or foul language, nudity, sex, or violence have become an increasing concern to Internet users. The problem is of particular concern to minors or sensitive persons browsing web pages with these kinds of content.

Systems and methods have been developed to provide regulation, control, and restriction of browsing web content materials. A general system and method that presently exists is one that involves assigning content labels to web pages and restricting access to web pages that have certain content labels. For example, if a web page contains nudity, then this web page would be assigned a nudity content label. The web browser is set up so that content labels, such as the nudity content label, is restricted from viewing, and the web browser prohibits the access of any web page having the nudity content label. The programmed setting of the web browser would have to be changed in order to allow access of web pages with such content. Typically, a password would have to be correctly provided to the web browser in order to change the single programmed setting to allow access of web pages with such content or web pages with other or various types of content labels with other content ratings.

Figure 2:
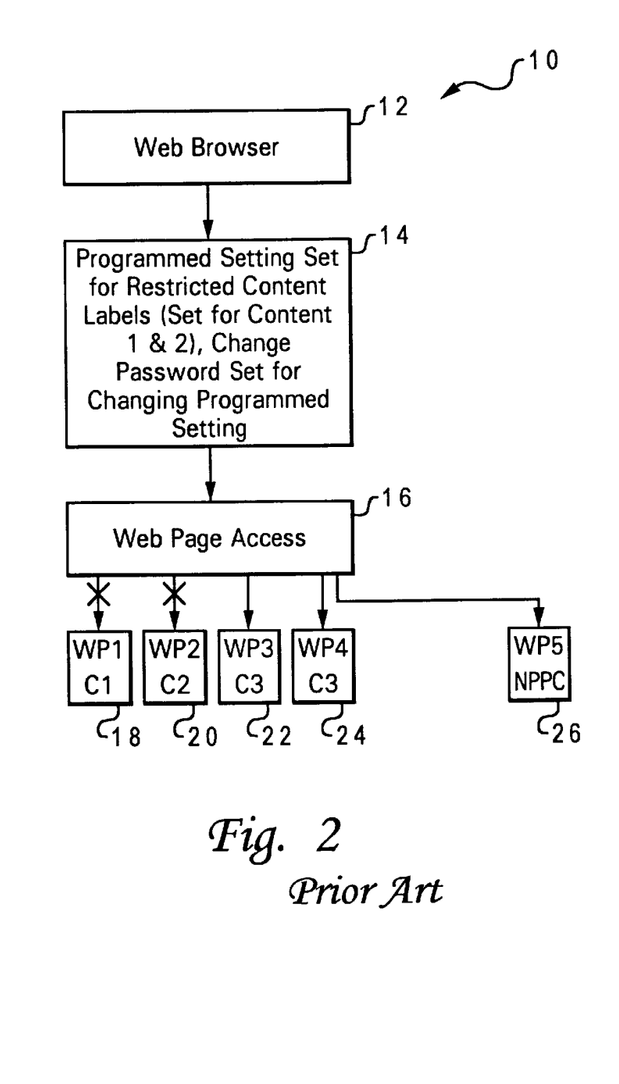
FIG. 2 is a block diagram of an overall topology of a prior art system that utilizes a single programmed setting for restricting content labels and a single password for a web browser to change the programmed setting.
Figure 3:
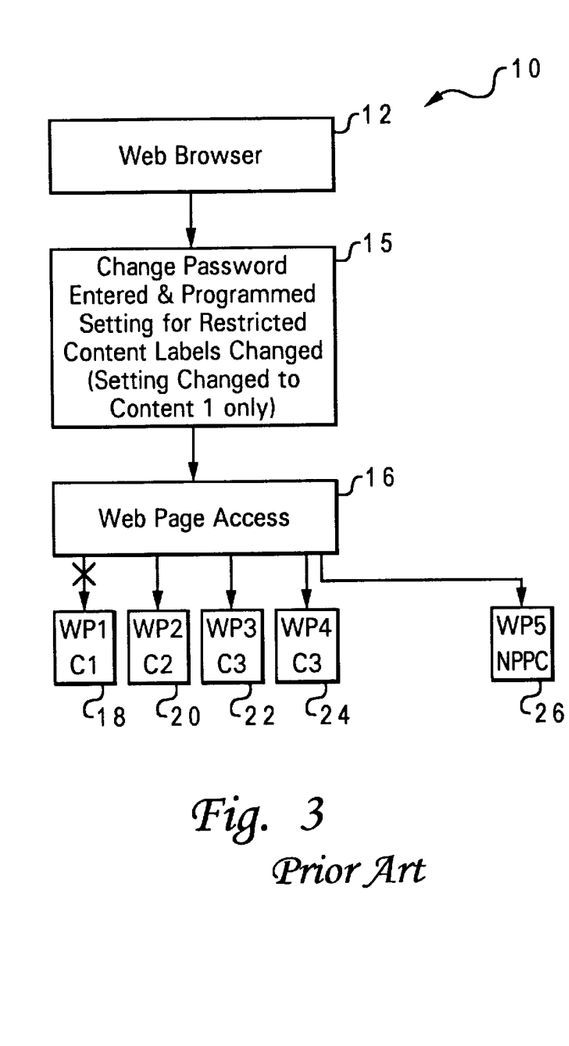
FIG. 3 is the block diagram of FIG. 1 wherein a change is made to the single programmed setting for the restricted content labels by providing the single password to the web browser and wherein access to web pages are shown to be changed accordingly.
Figure 4:
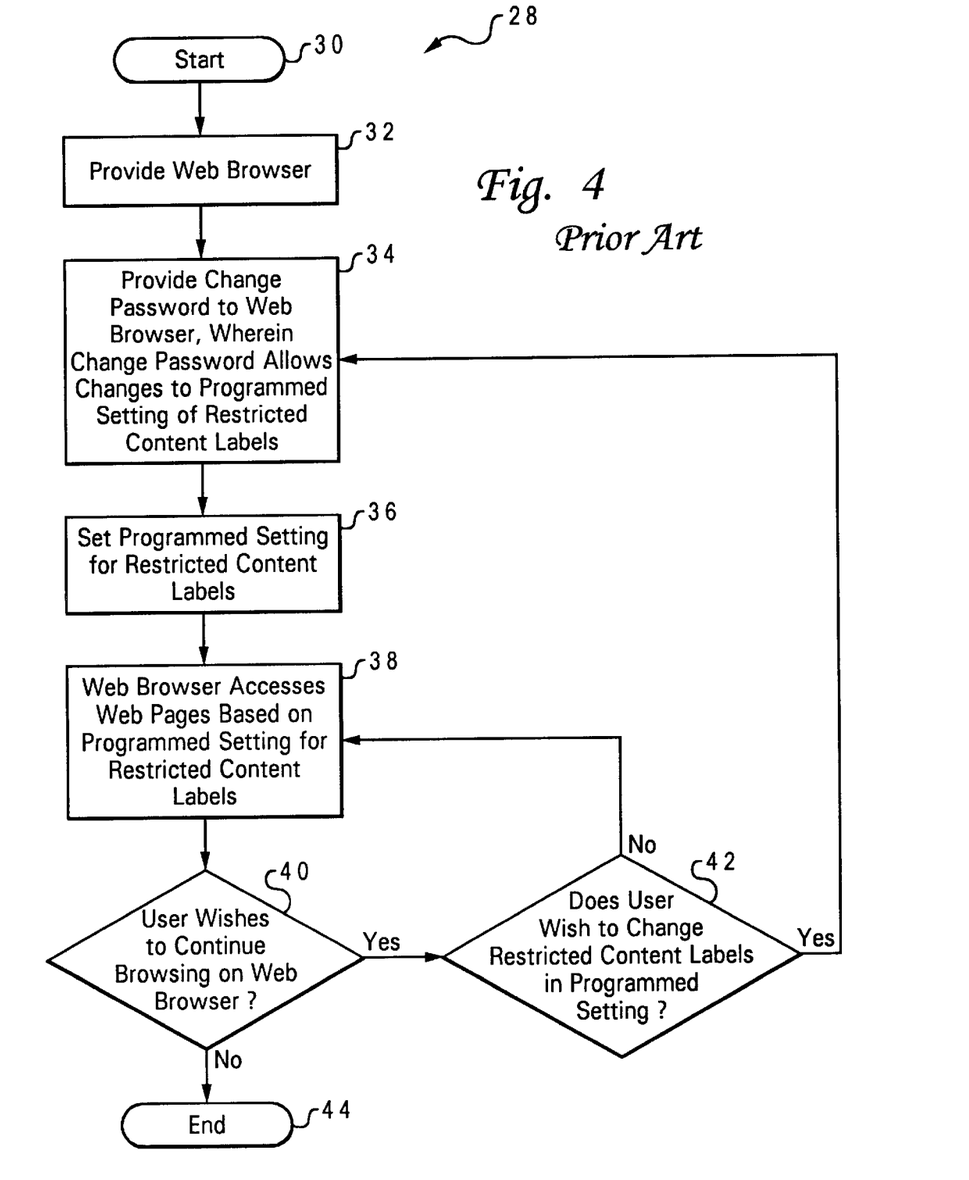
FIG. 4 is a flow chart of a general algorithm for setting the single programmed setting for restricted content labels and for password protecting the single programmed setting using the single password.

FIGS. 2 to 4 show a prior art example system and method that utilizes a single programmed setting for restricting content labels and a single password for a web browser to change the programmed setting in order to regulate and control browsing of web content by a user. FIG. 2 shows the prior art overall web browsing system 10. The system 10 has a web browser 12. At block 14, the single programmed setting is set with the content labels that are to be restricted from access by a web browser and user. In FIG. 2, the programmed setting is set so that restricted content labels having contents 1 and 2 are restricted from access by the browser 12 and web pages having any other content or content label, such as content 3 (C3) or non-password protected content (NPPC), are accessible by the browser 12. At block 14, the single change password that allows access by a user to change the single programmed setting for restricted content labels of web pages is provided and set. At block 16, web page access is shown. In FIG. 2, the web browser 12 is programmed and set (via use of the correct single change password and setting of the single programmed setting of restricted content labels) to restrict access to web page 1 (WP1) 18 having a content label with content 1 (C1) and web page 2 (WP2) 20 having a content label with content 2 (C2) and allows access to any other web page, such as web pages 3 and 4 (WP3 and WP4) each having a content label with content 3 (C3) and web page 5 (WP5) 26 having non-password protected content or content label. Thus, any web page having a content label that is not part of the single programmed setting of restricted content labels is allowed to be accessed by the web browser 12.

FIG. 3 shows the similar overall web browsing system 10 as shown in FIG. 2 wherein a change is made to the single programmed setting for the restricted content labels that are to be restricted in access by a user. System 10 has the same web browser 12. However, at block 15, the single change password is entered, and the single programmed setting for the restricted content labels is respectively changed. At block 15, the single setting for restricted content labels is changed from restrictions to content labels having content 1 and 2 (C1 and C2) to restrictions to only content labels having content 1 (C1 only). At block 16, web page access is shown. In FIG. 3, the web browser 12 is now changed to be programmed and set (via use of the single correct change password and the change in setting of the single programmed setting for the restricted content labels) to restrict the web browser 12 to access only those web pages having content 1 (C1), such as WP1 18 having content 1 (C1). The single programmed setting of the restricted content labels is also changed to now allow the web browser 12 to access those web pages having content 2 (C2), such as WP2 having content 2 (C2), and all other web pages with all other content or content labels, such as web pages 3 and 4 (WP3 and WP4) each having a content label with content 3 (C3) and web page 5 (WP5) 26 having non-password protected content or content label.

FIG. 4 shows a prior art general method or algorithm 28 for setting a single programmed setting for restricted content labels and for password protecting the web browser content label setting (i.e. the single programmed setting) using a single password. The algorithm 28 starts at block 30. At block 32, a web browser 12 is provided. The algorithm 28 moves to block 34 where a single change password is provided to and assigned for the web browser 12. The single change password allows changes to the single programmed setting of restricted content labels by entering and providing the correct single password to the web browser 12 and then allowing the changes to be made to the single programmed setting for the content labels that are to be restricted in access by the web browser 12 and a user. At block 36, the single programmed setting for restricted content labels that are to be restricted by a web browser 12 and user are set. At block 38, the web browser 12 accesses web pages, such as WP1 18, WP2 20, WP3 22, WP4 24, WP5 26, based on the single programmed setting for the restricted content labels.

The algorithm 28 moves to decision block 40 where it is determined whether a user wishes to continue browsing on the web browser 12. If the user wishes to continue browsing, then the algorithm 28 moves to decision block 42. At block 42, it is determined whether a user wishes to change the restricted content labels in the single programmed setting. If the user wishes to make such a change(s), the algorithm 28 loops back to block 34 where the single change password has to be provided to the web browser 12 in order for the change(s) to be accordingly made. The algorithm 28 then continues therefrom. However, if the user does not wish to make such change(s), the algorithm 28 loops to block 38 where the web browser 12 accesses web pages based on the single programmed setting for restricted content labels, and the algorithm 28 then continues therefrom. Returning to decision block 40, if the user wishes to not continue browsing on the web browser 12, then the algorithm 28 ends at block 44. Therefore, the present system and method only provides a single setting of restricted content labels and single password protection scheme of the web browser labels for a web browser 12.

A significant drawback to the single programmed setting for restricted web content labels and single password protection scheme of web browser content labels is that it is limited to the single setting of the restricted content labels and the content rating for all users of the web browser 12. Thus, users of the same web browser 12 may vary in the level of content that they may be able to browse (such as a child would have a much more restrictive content label and rating setting than an adult), but all of the users are limited to the single setting of the restricted content labels and content rating that is presently set for that web browser 12. For example, an adult user may want to use the web browser 12 to browse adult materials, but at the same time, a parent or adult would want to prevent his/her child or children from accessing and browsing these adult materials. If the single programmed setting for the restricted web content labels is set to not allow access to the adult material web sites, then the adult user wanting to use the browser 12 to browse adult materials on such web pages are prevented from doing so.

In order for the adult user to access these web pages with adult materials, the single programmed setting of restricted content labels would have to be changed to allow access of the desired content label(s). The single change password would have to be provided in order to make the change(s) to the programmed settings of the restricted content labels. Thus, if a change in content labels and content rating is required or desired for a user, then a further problem arises in that the single change password has to be divulged to the user or the user has to rely on for the system administrator or person having the password to make the change(s). Therefore, the prior art system and method utilizing the single programmed setting for restricted web content labels and single change password results in limitations and cumbersome and inconvenient situations, and they do not at all provide flexibility to the different types of users. Also, the divulging of the single change password can very well undermine the security of the content restricting system since the password may very well end up in the wrong hands.

It would therefore be advantageous and desirable to have a system and method that regulate browsing of web content or content labels which provide selective and multiple programmed settings and passwords for web content labels. It would also be advantageous and desirable to have a system and method that regulate browsing of web content or content labels which are not limited to the single setting for restricted web content labels as presently taught and implemented. It would further be advantageous and desirable to have a system and method that regulate browsing of web content or content labels which overcome the limitations and problems of having to use only a single password protection scheme of web browser content labels. It would still further be advantageous and desirable to have a system and method that regulate browsing of web content or content labels which are easy and convenient to use and which provide flexibility to different types of web browser users that are to be allowed or restricted from access of various types of contents or content labels of web pages. It would still also be advantageous and desirable to provide a system and method that regulate browsing of web content or content labels which overcome the limitations, problems, and disadvantages of the prior art.

SUMMARY OF THE INVENTION

It is therefore one object of the present invention to provide a system and method that regulate browsing of web content or content labels which provide selective and multiple programmed settings and passwords for web content labels.

It is another object of the present invention to provide a system and method that regulate browsing of web content or content labels which are not limited to the single setting for restricted web content labels as presently taught and implemented.

It is still another object of the present invention to provide a system and method that regulate browsing of web content or content labels which overcome the limitations and problems of having to use only a single password protection scheme of web browser content labels.

It is still a further object of the present invention to provide a system and method that regulate browsing of web content or content labels which are easy and convenient to use and which provide flexibility to different types of web browser users that are to be allowed or restricted from access of various types of contents or content labels of web pages.

It is also an object of the present invention to provide a system and method that regulate browsing of web content or content labels which overcome the limitations, problems, and disadvantages of the prior art.

The foregoing objects are achieved as is now described. A system and method that regulate browsing of web content or content labels which provide selective and multiple programmed settings and passwords for web content labels. The present system and method overcome limitations and problems of prior art systems and methods that utilize only a single programmed setting for restricted web content labels and a single password protection scheme of web browser content labels. The system and method provide flexibility to different types of web browser users that are to be allowed or restricted from access of various types of contents or content labels of web pages. At least some of the web pages are assigned content labels. A web browser is provided. Programmed settings are set for the content labels that are to be password protected. Content passwords are provided wherein each of the content passwords is assigned to each of the programmed settings. A change password is set up to allow any change to the programmed settings and/or the content passwords and/or the change password. Access and display of web pages without any content labels or ratings are strictly denied by the web browser. Access and display of web pages with content labels that are not being regulated are allowed. Access and display of the web pages with the content labels that are password protected are regulated and restricted. The web pages are accessed and displayed based on the programmed settings and correct provision of the content passwords to the web browser. Direct access to same content label pages within password timeout window resets the timer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a system and method that regulate browsing of web content or content labels which provide selective and multiple programmed settings and passwords for web content labels assigned to web pages. The present system and method that regulate browsing of web content or content labels overcome the limitations of the single programmed setting for restricted web content labels disclosed in prior art systems and methods. The present system and method that regulate browsing of web content or content labels also overcome the limitations and problems of prior art systems and methods that use only a single password protection scheme of web browser content labels. Furthermore, the present system and method that regulate browsing of web content or content labels are easy and convenient to use and provide flexibility to different types of web browser users that are to be allowed or restricted from access of various types of contents or content labels of web pages. The present system and method strictly denies access by the web browser to web pages without assigned content labels or ratings.

Figure 1:
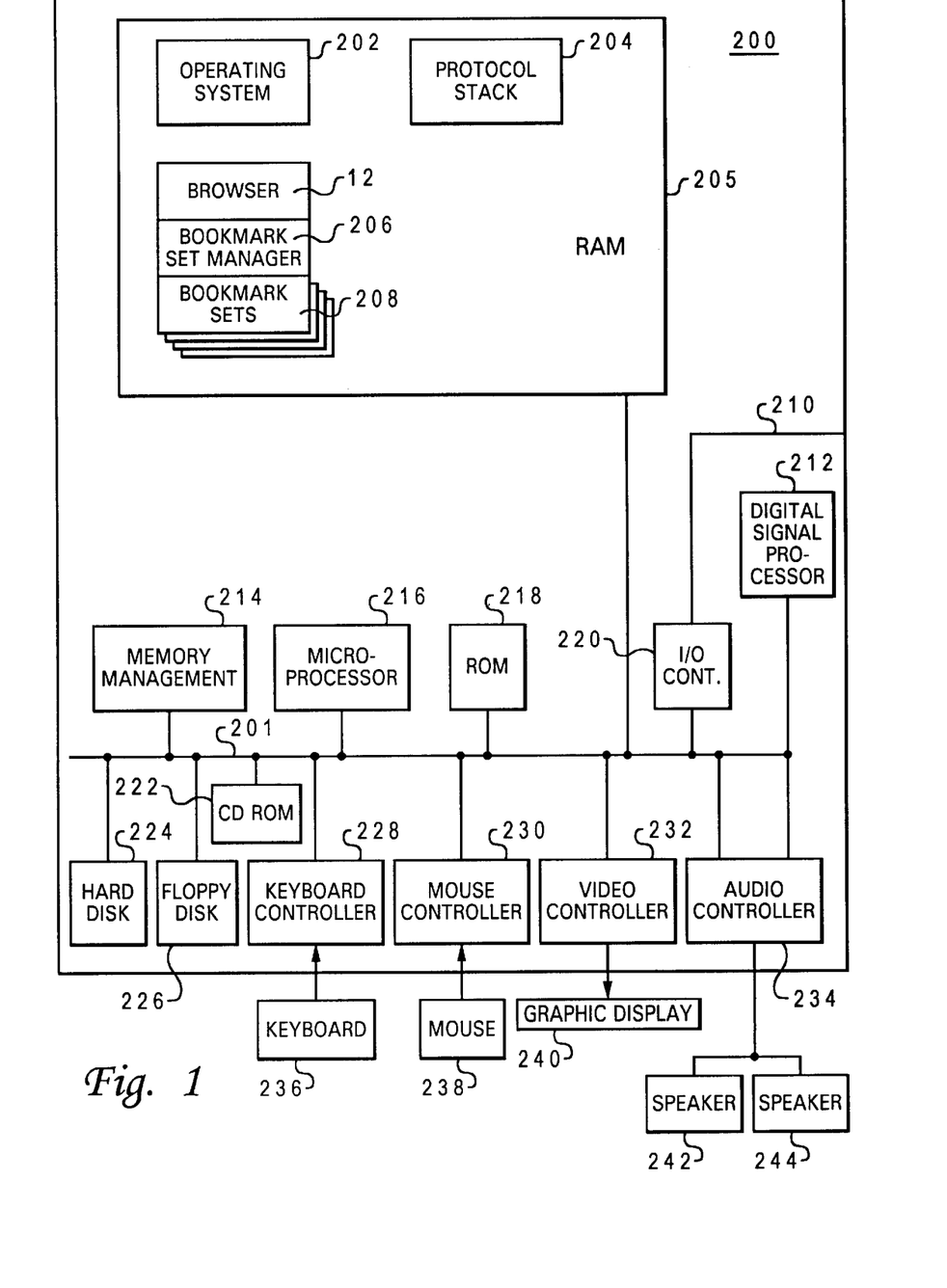
FIG. 1 is an overall block diagram of the hardware system for implementing the present invention that provides multiple programmed settings for restricting contents and content labels of web pages and that provides respective content passwords to allow a web browser to access web pages based on the programmed settings.

With reference now to the figures and in particular with reference to FIG. 1, an overall block diagram of the hardware system 200 for implementing the present invention that provides multiple programmed settings for restricting contents and content labels of web pages and that provides respective content passwords to allow a web browser to access web pages based on the programmed settings is shown. The hardware system 200 is generally a computer system that provides Internet access and web browsing. The hardware system 200 has a number of computer sub-systems in communications with or to each other on a communications bus 201. The various computer sub-systems coupled to the bus 201 include but are not limited to the following systems or devices: a memory management system 214, a microprocessor 216, a read only memory (ROM) system 218, a random access memory (RAM) system 205, an input/output controller (I/O CONT.) 220, a digital signal processor 212, a hard disk 224, a floppy disk 226, a CD ROM 222, a keyboard controller 228, a mouse controller 230, a video controller 232, and an audio controller 234. The I/O CONT. 220 provides communications to an input/output device via line 210. A keyboard 236 is coupled to the keyboard controller 228. A mouse 238 is coupled to the mouse controller 230. A graphic display 240 is coupled to the video controller 232. Speakers 242 and 244 are coupled to the audio controller 234. The RAM system 205 is divided into at least the following memory allocations: 1) operating system 202; 2) protocol stack 204; 3) a browser or web browser 12; 4) a bookmark set manager 206; and 5) bookmark sets 208. The present invention is not in any way limited to the specific hardware disclosed above for the system 200, and any suitable system, sub-system, and/or device may be used to implement the present invention or in conjunction with the present invention.

Figure 5:
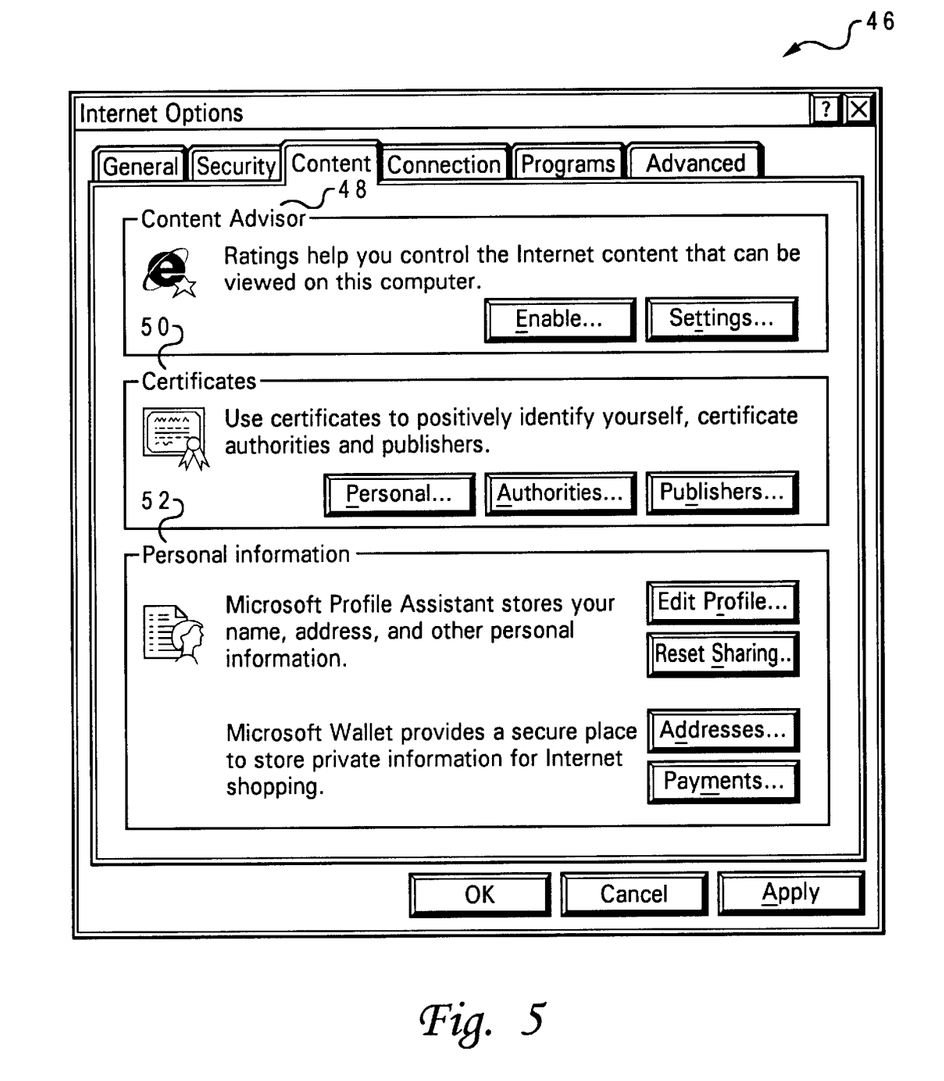
FIG. 5 is a computer display screen showing the web browser content settings for password protecting multiple programmed settings of restricted content labels for the present invention.

With reference now to the figures and in particular with reference to FIG. 5, a computer display screen 46 is shown with the web browser content settings of restricted content labels. The content settings include content advisor 48, positive identification certificate 50, and personal information 52. In FIG. 5, the web browser administrator protects the content settings in the same manner as the prior art single programmed setting and single password protection system and method.

The change password is enabled and provided to web browser 12. With reference now to the figures and in particular with reference to FIG. 6, a computer display screen 53 is accessed to create and password protect each content label or group of content labels by assigning each label or group a content password. The computer display screen 53 is shown to have a ratings menu 51. The ratings menu 51 has a category field 54, a rating field 55, and a description field 60. The category field 54 contains a category ratings file 56, and the category ratings file 56 contains the various content labels 58, such as language content label, nudity content label, sex content label, and violence content label. One or more content labels may be grouped to use a common content password. Each content label has an indication that it is password protected by a particular content password or passwords and also has an entry field for the particular content password or passwords.

Figure 6:
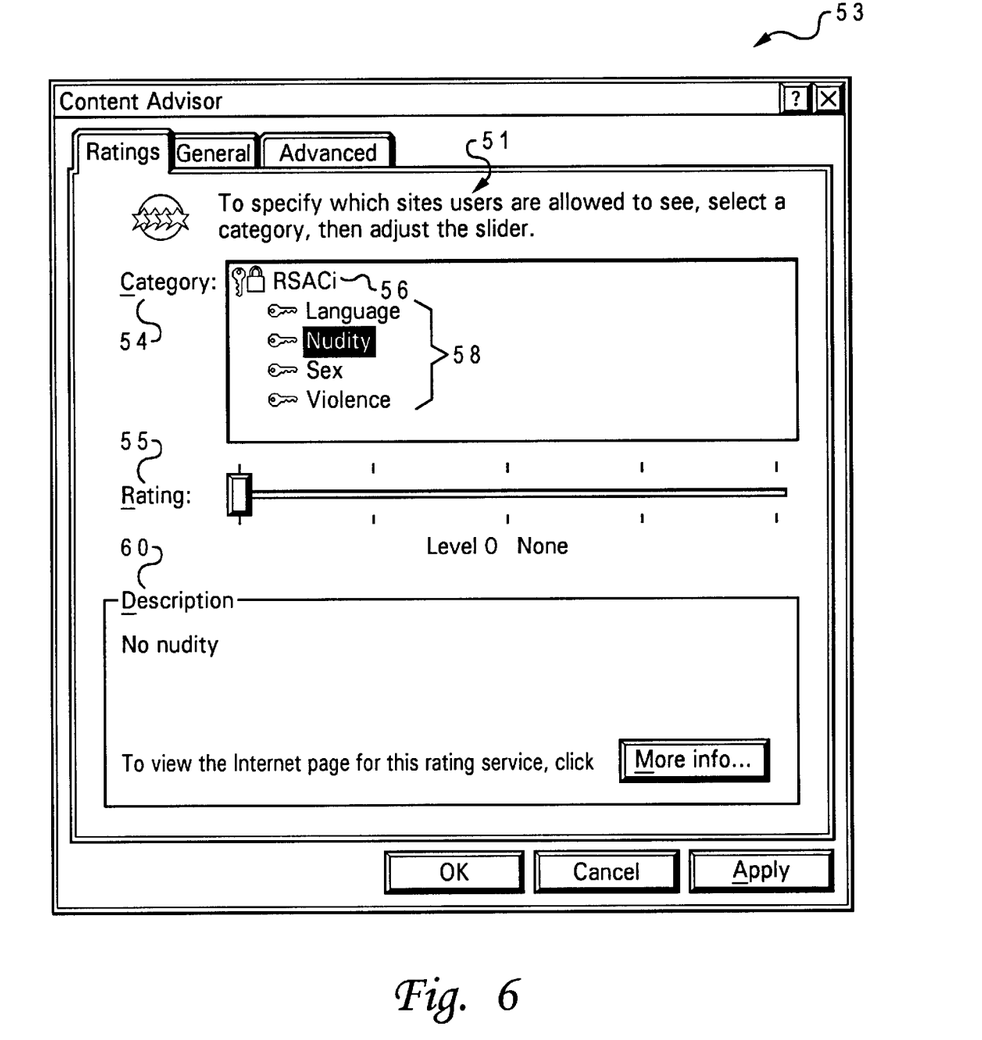
FIG. 6 is a computer display screen showing the range option of the web content advisor selection for the present invention.

In order to make any changes to the content settings, the change password or system administrator password is required to be provided to the system administration operations of the web browser 12. These changes include changes to the programmed settings of restricted content label(s) or group(s) and to the content passwords and the change password. Referring to FIG. 6, "Language" and "Violence" content labels 58 could be grouped together and password protected using a content password. Particular key sequences may be defined (such as "Ctrl-Select") to group together several content labels. Once a group of label(s) is selected, a content password is set and assigned for the group. When a web browser user requests a web page which has a content label value that is password protected, the web browser 12 displays a pop-up window requesting the input of the correct content password in order to display the web page. If the content password is correct, then the web browser 12 displays the web page as normal. If the content password is not correct, then the web browser 12 does not display the web page and the content from the browser cache is cleared. The browser cache is cleared to prevent viewing the web page content via other means (such as a file/image viewer) when the correct password is not entered. When a web browser user requests a web page which has a content label or rating that is not password protected, the web browser 12 displays the web page as normal without any restriction. When a web browser user requests a web page which does not have a content label or rating, the web browser 12 denies access and denies display of the web page and the content from the browser cache is also cleared.

Figure 7:
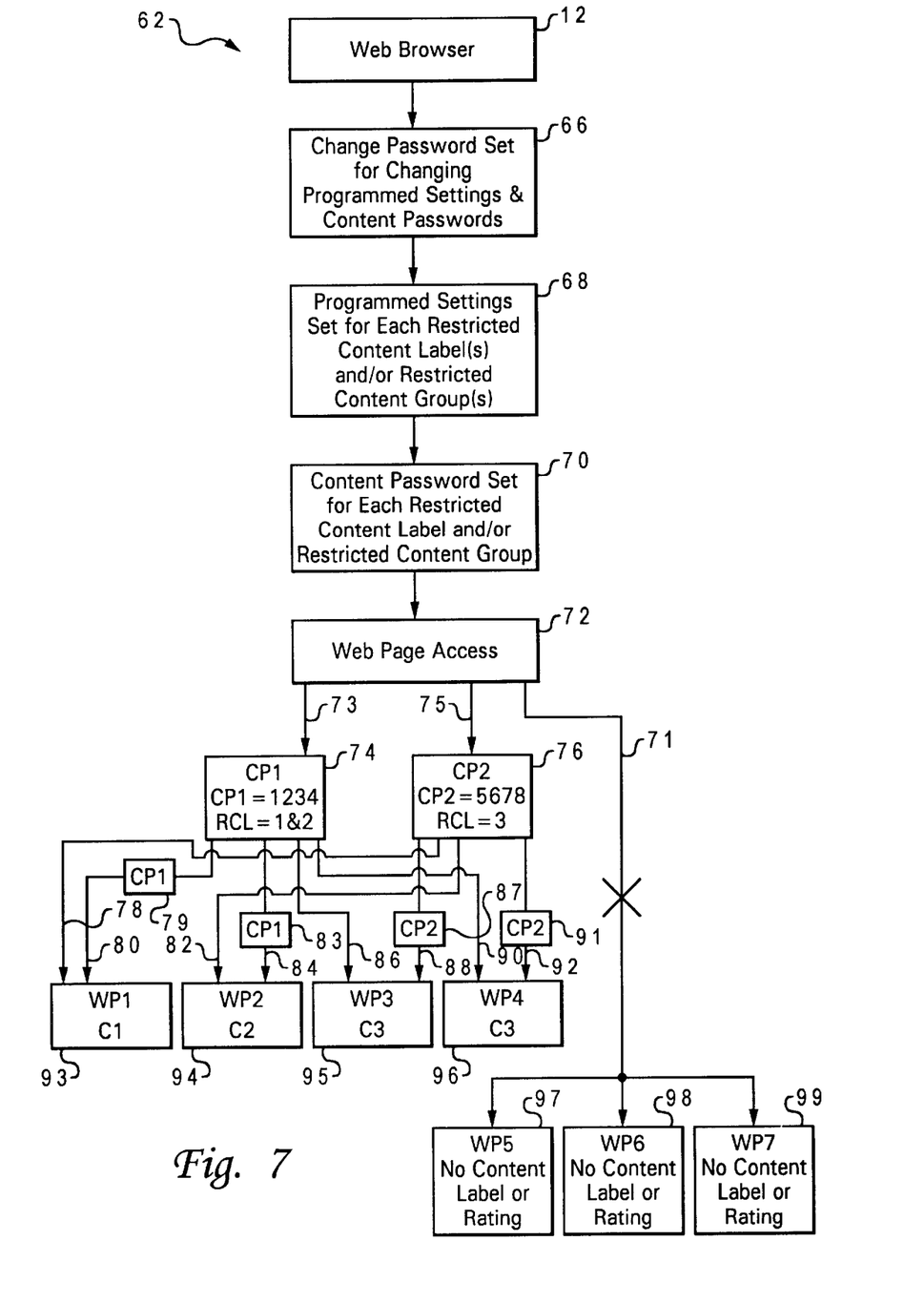
FIG. 7 is a block diagram of an overall topology of the present system that provides multiple programmed settings for restricting contents and content labels of web pages and that provides respective content passwords to allow a web browser to access web pages based on the programmed settings.

With reference now to the figures and in particular with reference to FIG. 7, an overall topology of the present system 62 is shown. The system 62 provides multiple programmed settings for restricting contents and content labels of web pages and provides respective content passwords to allow a web browser 12 to access web pages based on the programmed settings. The system 62 also provides a change password to allow changes to the programmed settings and/or the content passwords. The system 62 has a web browser 12. At block 66, a change password is provided and set. The change password is provided to the web browser 12 to allow changes to the programmed settings and/or the content passwords. At block 68, the programmed settings are set for each restricted content label(s) and/or restricted content group(s). At block 70, a content password is set for each restricted content label and/or each restricted content group. Block 72 shows the web page access for the system 62.

The lines 73 and 75 show accesses from block 72 to web pages that have assigned content labels or ratings that are password protected and that are not password protected while the line 71 shows denial of access from block 72 to web pages that are not assigned content labels or ratings. FIG. 7 shows that line 71 is restricted and strictly denied access to web pages 5, 6, and 7 (WP5 97, WP6 98, and WP7 99) since they do not have assigned any content label or rating. FIG. 7 shows that the web browser 12 has been denied access via block 72 and is not able to access and display these web pages WP5 97, wP6 98, and WP7 99 at all.

In FIG. 7, line 73 is directed to block 74. At block 74, content password 1 (CP1) needs to be provided in order to access the web pages that have the programmed set restricted content labels (RCL) for CP1. In the FIG. 6 example for block 74, CP1 is set as "1234" and RCL is set to password restrict contents 1 and 2 (1 and 2), that is, web pages with content labels 1 (C1) or content labels 2 (C2) are password restricted. Therefore, the web browser 12 from block 74 is able to freely access all web pages with assigned content labels that are not content labels 1 or 2 (C1 or C2).

In order for the web browser 12 to access and display web pages with content labels 1 or 2 (C1 or C2), the content password 1 (CP1) must first be provided to the web browser 12 (i.e. via inputting the content password to a pop-up request display on the computer screen). FIG. 7 shows that access line 80 from the block 74 to the web page 1 (WP1) 93 with content label 1 (CP1) is not able to be accessed or displayed until the content password 1 (CP1=1234) at block 79 is provided to the web browser 12. Furthermore, FIG. 7 shows that access line 84 from the block 74 to the web page 2 (WP2) 94 with content label 2 (CP2) is also not able to be accessed or displayed until the content password 1 (CP1=1234) at block 83 is provided to the web browser 12. However, FIG. 7 further shows that direct access without any password (i.e. CP1) is permitted to web pages with any other content labels, such as web pages 3 and 4 (WP3 95 and WP4 96) each with content label 3 (C3) via respective lines 86 and 90. If the correct content password (i.e. CP1=1234) is not provided to the browser 12 for the web page having the restricted content label (i.e. content label C1 or C2), the browser 12 denies access to the web page having content label C1 or C2 and clears and prevents any further access of that web page.

In FIG. 7, line 75 is directed to block 76. At block 76, content password 2 (CP2) needs to be provided in order to access the web pages that have the programmed set restricted content labels (RCL) for CP2. In the FIG. 7 example for block 76, CP2 is set as "5678" and RCL is set to password restrict content 3 (3), that is, web pages with content labels 3 (C3) only are password restricted. Therefore, the web browser 12 from block 76 is able to freely access all web pages with assigned content labels that are not content labels 3 (C3). In order for the web browser 12 to access and display web pages with content labels 3 (C3), the content password 2 (CP2) must first be provided to the web browser 12 (i.e. via inputting the content password to a pop-up request display on the computer screen). FIG. 7 shows that access line 88 from the block 76 to the web page 3 (WP3 95) with content label 3 (CP3) is not able to be accessed or displayed until the content password 2 (CP2=5678) at block 87 is provided to the web browser 12. Furthermore, FIG. 7 shows that access line 92 from the block 76 to the web page 4 (WP4 96) with content label 3 (CP3) is also not able to be accessed or displayed until the content password 2 (CP2=5678) at block 91 is provided to the web browser 12. However, FIG. 7 further shows that direct access without any restriction or password (i.e. CP2) is permitted to web pages with any other content labels, such as web pages 1 and 2 (WP1 93 and WP2 94) with respective content labels 1 (C1) and 2 (C2) via respective lines 78 and 82. If the correct content password (i.e. CP2=5678) is not provided to the browser 12, the browser 12 denies access to the web page having content label C3 and clears and prevents any further access of that web page.

Figure 8:
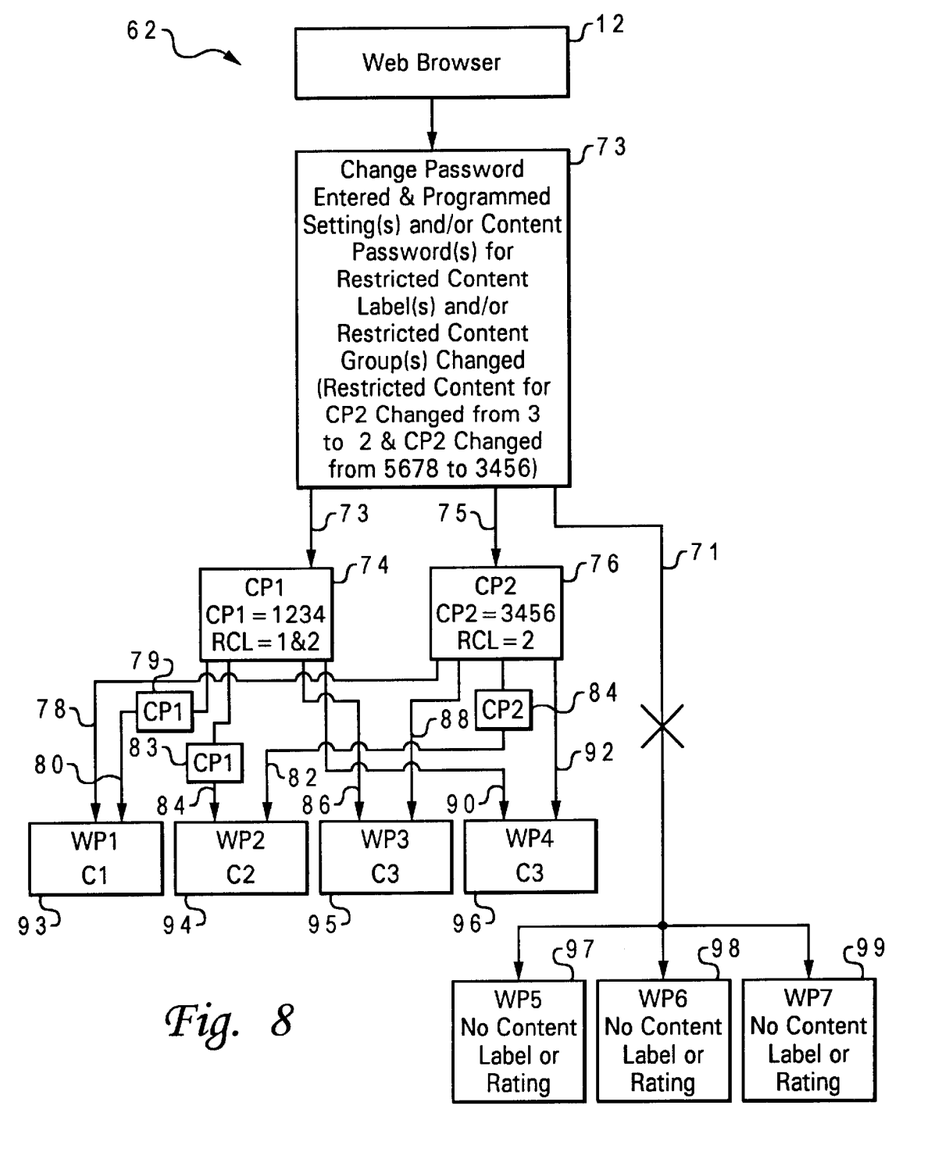
FIG. 8 is the block diagram of FIG. 6 wherein a change is made to one of the multiple programmed settings for the restricted content labels and a change is also made to one of the content passwords by providing the change password to the web browser and wherein access to web pages are shown to be changed accordingly.

With reference now to the figures and in particular with reference to FIG. 8, an overall topology of the same present system 62 of FIG. 7 is shown. However, FIG. 8 shows a change made to one of the multiple programmed settings for the restricted content labels (i.e. the programmed setting RCL for CP2 is changed) and also shows a change made to one of the content passwords (i.e. CP2 is changed) by providing the change password to the web browser. FIG. 8 shows access to the web pages based accordingly on the changes.

FIG. 8 shows the system 62 with web browser 12. Blocks 68, 70, and 72 of FIG. 7 are no longer shown, and the web browser 12 is directed to a block 73. At block 73, the correct change password that was set in block 66 of FIG. 7 is entered and provided to the web browser 12 in order to make changes. The programmed setting(s) and/or content password(s) for restricted content label(s) and/or restricted content group(s) are changed as desired or needed after the correct change password has been entered. In the FIG. 8 example, the restricted content for CP2 has been changed from RCL=2 to RCL=3, and the content password CP2 has been changed from "5678" to "3456". Therefore, the strict denial of access by browser 12 to WP5 97, WP6 98, and WP7 99 with no assigned content label or rating does not change and remains the same as in FIG. 7. Also, the access by browser 12 via CP1 from block 74 to web pages WP1 93, WP2 94, WP3 95, and WP4 96 remain the same as in FIG. 7, that is, access remains the same from block 74 via respective access lines 80, 84, 86, and 90 to WP1 93, WP2 94, WP3 95, and WP4 96 as was discussed above for FIG. 7.

However, in FIG. 8, the access by browser 12 from block 76 via CP2 changes. CP2 is now changed to "3456" instead of "5678" and RCL is set to password restrict content 2 (2) instead of content 3 (3), that is, web pages with content labels 2 (C2) only are now password restricted. Therefore, the web browser 12 from block 76 is now changed to be able to freely access all web pages with assigned content labels that are not content labels 2 (C2) instead of content labels 3 (C3). In order for the web browser 12 to now access and display web pages with content labels 2 (C2), the content password 2 (CP2) must first be provided to the web browser 12 (i.e. via inputting the content password to a pop-up request display on the computer screen). FIG. 8 shows that access line 82 from the block 76 to the web page 2 (WP2) 94 with content label 2 (CP2) is now not able to be accessed or displayed until the newly changed content password 2 (CP2=3456 instead of CP2=5678) at block 81 is provided to the web browser 12. Furthermore, FIG. 8 shows that access lines 88 and 92 to WP3 95 and WP4 96 each with C3 are no longer password protected. Thus, FIG. 8 shows that direct access without any restriction or password (i.e. CP2) is permitted to web pages with any other content labels, such as web pages 1, 3, and 4 (WP1 93, WP3 95, and WP4 96) with respective content labels 1 (C1), 3 (C3), and 3 (C3) via respective lines 78, 88, and 92. If the present correct content password (i.e. CP2=3456 instead of CP2=5678) is not provided to the browser 12, the browser 12 denies access to the web page having content label C2 and clears and prevents any further access of that web page.

Figure 9A:
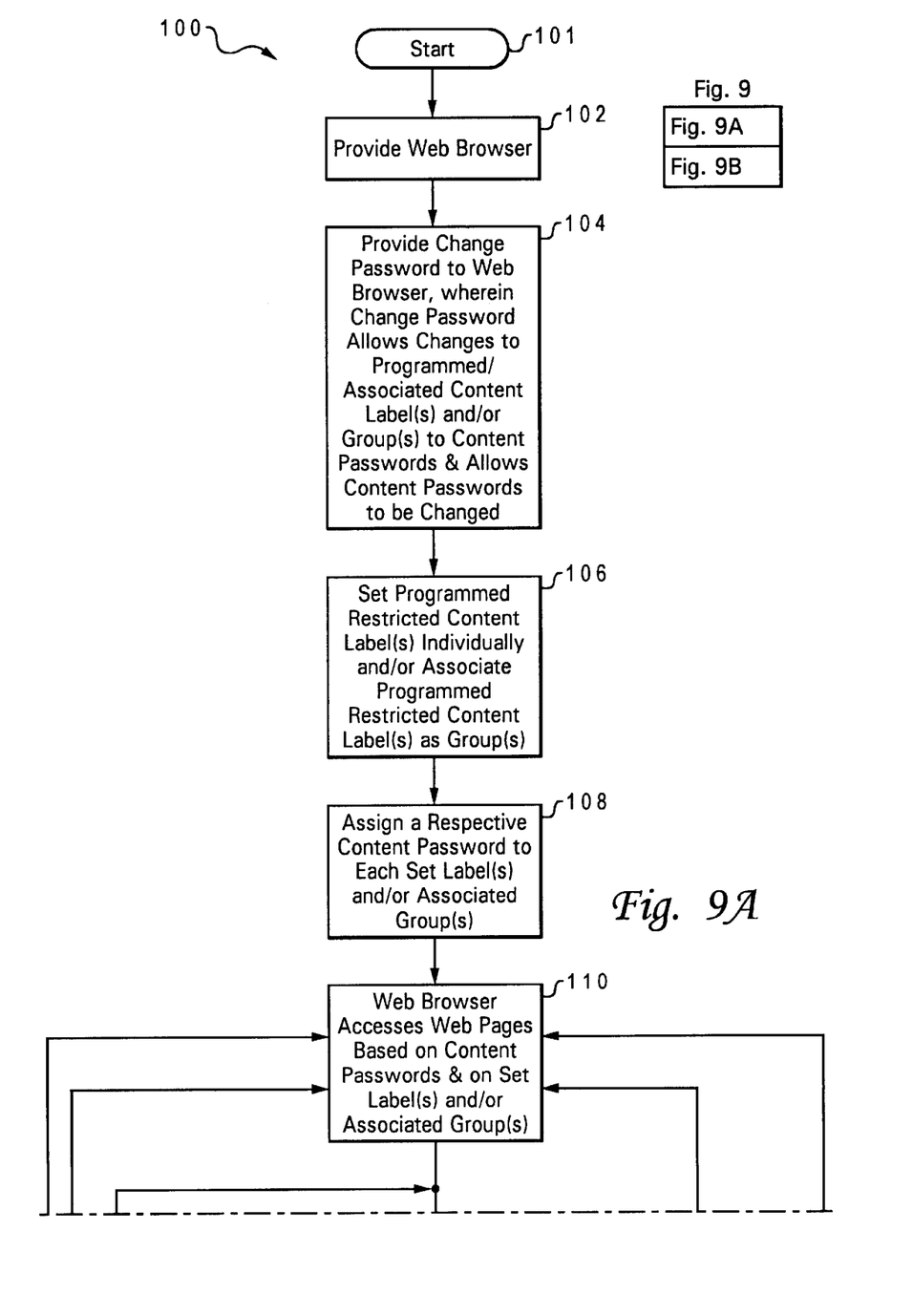
FIG. 9 is a flow chart of a general algorithm for setting the multiple programmed settings for restricted content labels and for password protecting the multiple programmed settings using a change password and multiple content passwords.
Figure 9B:
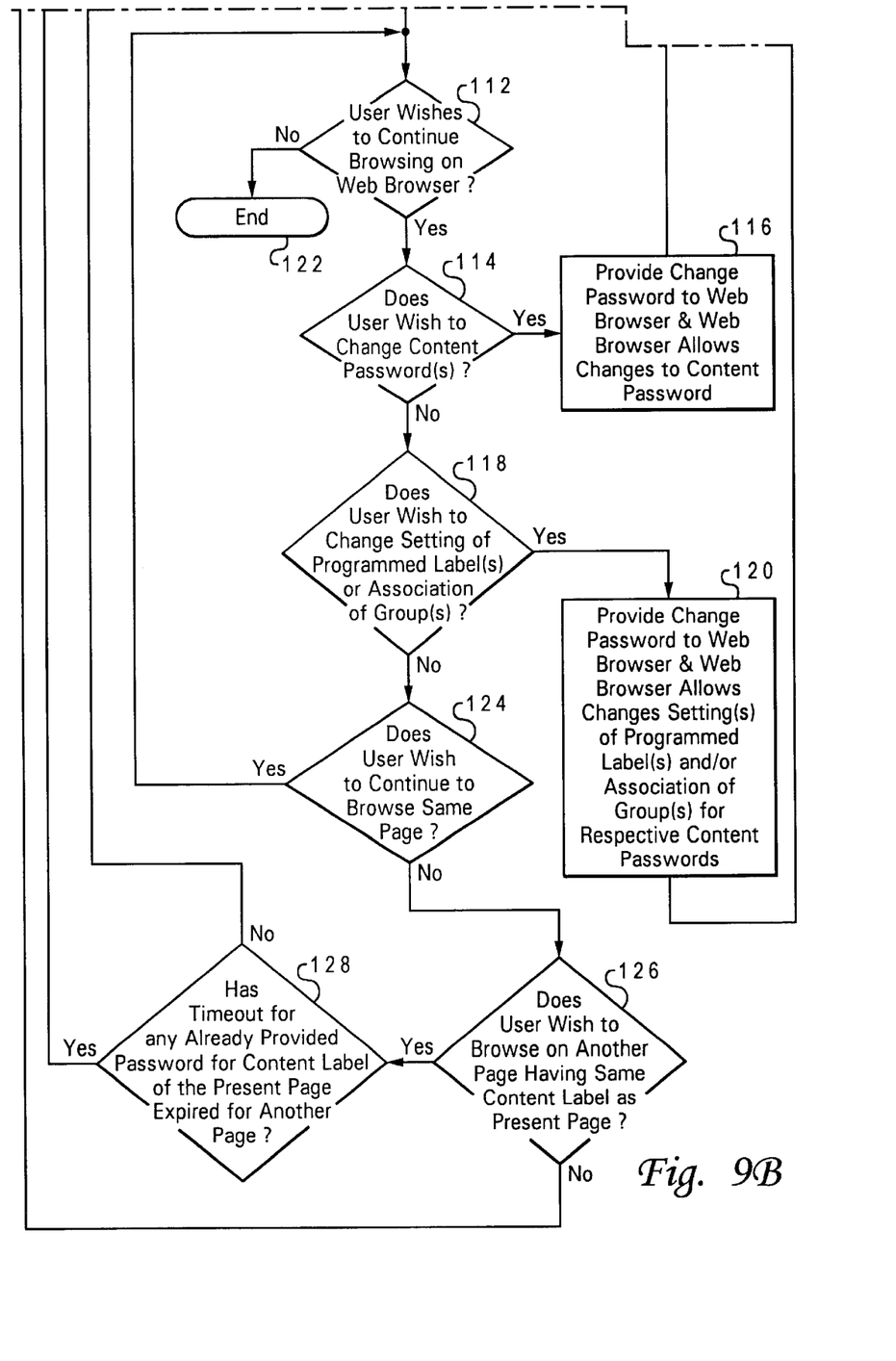

With reference now to the figures and in particular with reference to FIG. 9, a flow chart of a general algorithm 100 for setting the multiple programmed settings for restricted content labels and for password protecting the multiple programmed settings using a change password and multiple content passwords is shown. The algorithm 100 starts at block 101. At block 102, a web browser 12 is provided. The algorithm 100 moves to block 104 where a change password is set up and provided. The change password is provided to the web browser 12 to allow changes to one of the programmed settings, that is, one of the associated content label(s) and/or group(s) each assigned to a content password. At block 104, any content password is also allowed to be changed as needed or desired after the change password is provided to the web browser.

The algorithm 100 moves to block 106 where the programmed restricted content label(s) individually is/are set and/or the programmed restricted content label(s) is/are associated as a group(s), that is, the programmed settings for the content label(s) and/or group(s) are set. At block 108, a respective content password is assigned to each set label(s) and/or associated group(s). At block 110, the web browser 12 accesses and displays web pages based on set label(s) and/or associated group(s). The algorithm 100 then moves to decision block 112.

At decision block 112, algorithm 100 determines whether the user wishes to continue browsing on the web browser 12. If the user does not wish to continue browsing, then algorithm 100 ends at block 122. On the other hand, if the user does wish to continue browsing, then the algorithm 100 moves to decision block 114. At decision block 114, the algorithm 100 determines whether the user wishes to change any content password for a programmed setting(s). If the user does wish to change a content password(s), then the algorithm 100 moves to block 116 where the correct change password is provided to the web browser 12 and the web browser 12 allows changes to the content password(s) via programming or directed instructions. The algorithm 100 loops back to block 110 where it continues therefrom.

However, if the user does not wish to change any content password(s) at decision block 114, then the algorithm 100 moves to decision block 118. At decision block 118, the algorithm 100 determines whether the user wishes to change any programmed setting, that is, any setting of programmed content label(s) and/or association of content group(s). If the user does wish to make such a change to any programmed setting, then the algorithm 100 moves to block 120 where the correct change password is provided to the web browser 12 and the web browser 12 allows the respective changes of the programmed setting(s), that is, respective changes to the setting(s) of programmed label(s) and/or association of group(s) for respective content password(s). After block 120, the algorithm loops back to block 110 and continues therefrom. On the other hand, if the user does not wish to make a change to any programmed setting at decision block 118, then the algorithm 100 moves to decision block 124.

At decision block 124, the algorithm 100 determines whether the user wishes to continue browsing the same web page. If the user does wish to continue browsing the same web page, then algorithm 100 loops to decision block 112 and continues therefrom. However, if the user does not wish to continue browsing the same page, the algorithm 100 moves to decision block 126. At decision block 126, the algorithm 100 determines whether the user wishes to browse another web page having the same content label as the present page. If the user does not wish to browse another page with the same content label, then the algorithm 100 loops back to decision block 110 and continues therefrom. However, if the user does wish to browse another page with the same content label, then the algorithm 100 moves to decision block 128. At decision block 128, the algorithm 100 determines whether a timeout for any already provided content password for the content label of the present web page has expired for another web page having the same content label. If such a timeout has not expired, then the algorithm 100 loops back to decision block 112 and continues therefrom. However, if such a timeout has expired, then the algorithm 100 loops back to block 110 and continues therefrom.

The programmed setting also includes the feature of assigning, setting, and using a timeout value for the timeout wherein the timeout value is reset every time a new page with the same content label for which a correct password has been already provided by the user is displayed. The timeout value resets so that the timer for the already provided correct password does not expire for the new page(s), and request for the correct password is by-passed. Otherwise, if the timer expires the timeout value, then the correct password has to again be requested by the web browser 12, and it then needs to be re-entered.

While the invention has been particularly shown and described with reference to a preferred embodiment, it will be understood by those skilled in the art that various changes in form and detail may be made therein without departing from the spirit and scope of the invention.

What is claimed is:

1. A method of regulating and password protecting access and display of web pages by a web browser, wherein at least some of the web pages are assigned particular ones of a plurality of content labels each identifying a particular type of content in the web pages, said method comprising:

associating each of a plurality of different content passwords with a respective set of the plurality of content labels to be password protected, wherein the sets of content labels associated with at least two of the plurality of different content passwords are different, permitting the web browser to access and display a web page having a particular content label that is password protected in response to entry of a content password associated with a set of content labels including the particular content label, allowing the web browser to access and display of web pages having content labels that are not password protected, and restricting display by the web browser of the web pages with no content labels.

2. The method according to claim 1, wherein said associating comprises
   individually password protecting a selected content label among the plurality of content labels by assigning said selected content label to a set associated with a selected one of the plurality of different content passwords that contains only said selected content label.

3. The method according to claim 1, wherein said associating comprises:
   associating a selected one of said plurality of different content passwords with a set containing multiple content labels.

4. The method according to claim 1, further comprising:
   permitting modification of at least one of said sets of content labels in response to entry of a change password to the web browser.

5. The method according to claim 1, further comprising:
   permitting modification of any of the content passwords in response to entry of a change password to the web browser.

6. The method according to claim 1, further comprising:
   determining whether a timeout period has expired for any provided content password required to display a selected web page, and
   preventing display of the selected web page if the timeout period has expired.

7. The method according to claim 6, wherein the selected web page comprises a first web page having a selected content label, said method further comprising:
   resetting the timeout period of a selected content password in response to navigation directly from said first web page to a second web page having the same selected content label in its associated set of content labels.

8. A data processing system that regulates access to and display of web pages having particular types of content, said data processing system comprising:

a processor,
   a display system coupled to said processor,
   an input/output interface coupled to a network for communication therewith,
   data storage coupled to said input/output interface and to said processing resources,
   a web browser within said data storage and executable by said processor for causing said data processing system to access and display web pages stored remotely within said network, wherein at least some of the web pages are assigned particular ones of a plurality of content labels each identifying a particular type of content in the web pages, wherein said web browser includes:
      means for associating each of a plurality of different content passwords with a respective set of the plurality of content labels that are to be password protected, wherein the sets of content labels associated with at least two of the plurality of different content passwords are different,
      means for permitting access to and display of a web page having a particular content label that is password protected in response to entry of a content password associated with a set of content labels including the particular content label,
      means for allowing access to and display of web pages having content labels that are not password protected, and
      means for restricting access to and display of web pages with no content labels.

9. The data processing system according to claim 8, wherein said means for associating comprises:
   means for individually password protecting a selected content label among the plurality of content labels by assigning said selected content label to a set associated with a selected one of the plurality of different content passwords that contains only said selected content label.

10. The data processing system according to claim 8, wherein said means for associating comprises:
    means for associating a selected one of said plurality of different content passwords with a set containing multiple content labels.

11. The data processing system according to claim 8, and further comprising means for permitting modification of at least one of said sets of content labels in response to entry of a change password to the web browser.

12. The data processing system according to claim 8, said web browser further comprising:
    means for determining whether a timeout period has expired for any provided content password required to display a selected web page; and
    means for preventing display of the selected web page if the timeout period has expired.

13. The system according to claim 12, wherein the selected web page comprises a first web page having a selected content label, said web browser further comprising:
    means for resetting the timeout period of a selected content password in response to navigation directly from said first web page to a second web page having the same selected content label in its associated set of content labels.

14. The method of clam 1, wherein said restricting comprises preventing display by the web browser of the web pages with no content labels.

15. The method of claim 1, and further comprising:
    clearing a cache of the web browser storing web page content in response to a failure to enter a correct content password required to display a requested web page.

16. The system of claim 8, wherein said means for restricting comprises means for preventing display of the web pages with no content labels.

17. The system of claim 8, and further comprising:
a web browser cache allocated within said data storage for storing web page content, wherein said web browser includes means for clearing said web browser cache in response to a failure to enter a correct content password required to display a requested web page.

18. A program product that regulates access display of web pages having particular types of content, said program product comprising:
a computer usable medium; and
a web browser encoded within said computer usable medium and executable by a data processing system to cause the data processing system to access and display web pages, wherein at least some of the web pages are assigned particular ones of a plurality of content labels each identifying a particular type of content in the web pages, wherein said web browser includes:
means for associating each of a plurality of different content passwords with a respective set of the plurality of content labels that are to be password protected, wherein the sets of content labels associated with at least two of the plurality of different content passwords are different,
means for permitting access to and display of a web page having a particular content label that is password protected in response to entry of a content password associated with a set of content labels including the particular content label,
means for allowing access to and display of web pages having content labels that are not password protected, and
means for restricting access to and display of web pages with no content labels.

19. The program product of claim 18, wherein said means for associating comprises means for individually password protecting a selected content label among the plurality of content labels by assigning said selected content label to a set associated with a selected one of the plurality of different content passwords that contains only said selected content label.

20. The program product of claim 18, wherein said means for associating comprises means for associating a selected one of said plurality of different content passwords with a set containing multiple content labels.

21. The program product of claim 18, and further comprising means for permitting modification of at least one of said sets of content labels in response to entry of a change password to the web browser.

22. The program product of claim 18, said web browser further comprising:
means for determining whether a timeout period has expired for any provided content password required to display a selected web page; and
means for preventing display of the selected web page if the timeout period has expired.

23. The program product of claim 22, wherein the selected web page comprises a first web page having a selected content label, said web browser further comprising:
means for resetting the timeout period of a selected content password in response to navigation directly from said first web page to a second web page having the same selected content label in its associated set of content labels.

24. The program product of claim 18, wherein said means for restricting comprises means for preventing display of the web pages with no content labels.

25. The program product of claim 18, and further comprising:
means for clearing a web browser cache storing web page content in response to a failure to enter a correct content password required to display a requested web page.

* * * * *